Aug. 31, 1954    A. W. GAIR ET AL    2,687,926
BEARING SUPPORT
Filed June 19, 1951
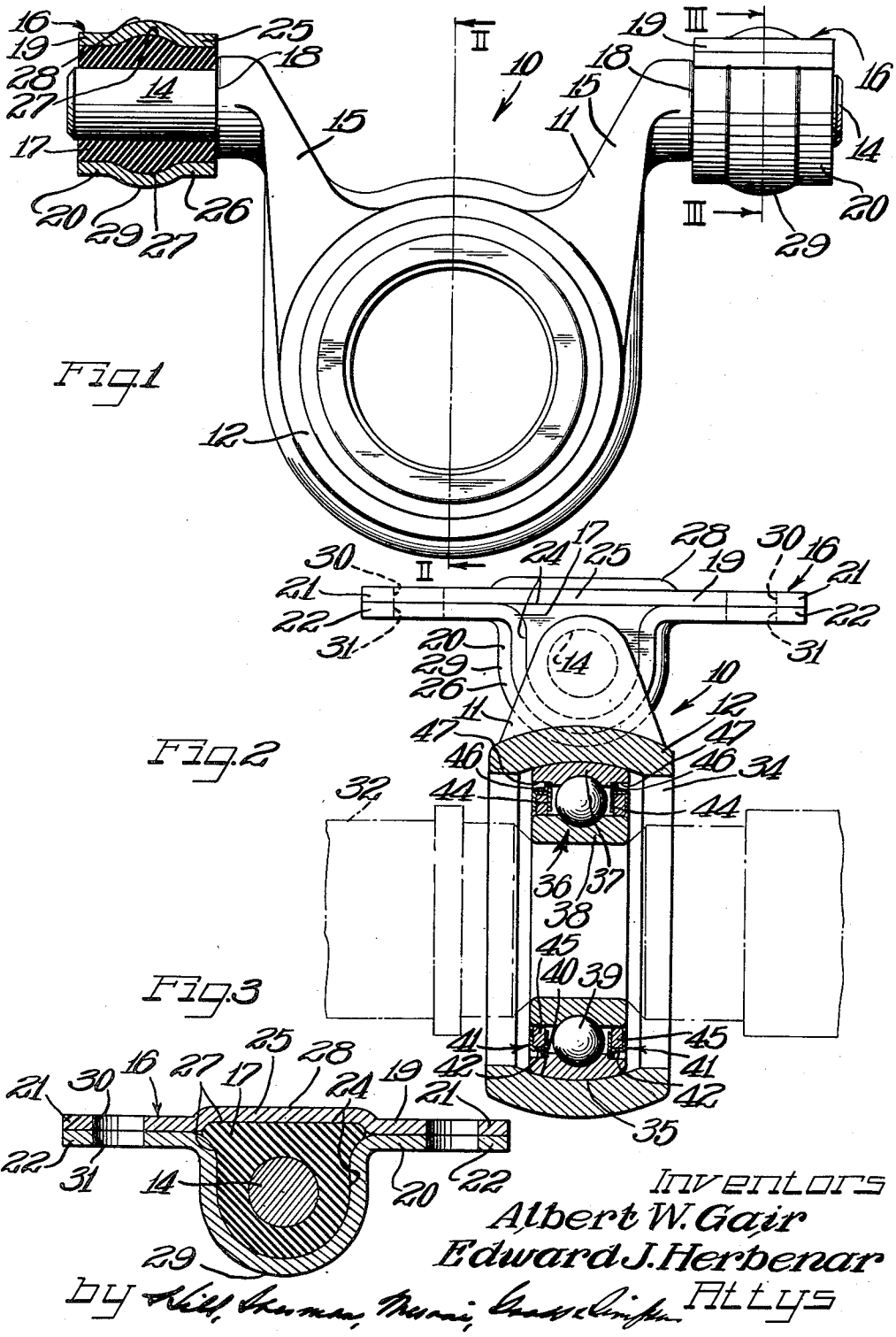
Inventors
Albert W. Gair
Edward J. Herbenar Patented Aug. 31, 1954

2,687,926

UNITED STATES PATENT OFFICE 2,687,926

BEARING SUPPORT

Albert W. Gair, Fraser, and Edward J. Herbenar, Detroit, Mich., assignors to Thompson Products, Inc., Cleveland, Ohio, a corporation of Ohio Application June 19, 1951, Serial No. 232,416

7 Claims. (Cl. 308—28)

This invention relates to an improved shaft bearing hanger for a vehicle and more particularly to an offset trunnion type resilient bearing support for rotatably and resiliently securing the vehicle propeller shaft to a cross frame member in a construction utilizing two or more shaft sections.

In mounting a propeller shaft in a vehicle, especially when the shaft is composed of two or more sections, it is desirable to rotatably and resiliently support the shaft intermediate the end portions to prevent "whip" and to eliminate vibrations and noise which would ordinarily be transferred from the shaft to the vehicle frame. In addition, in some installations a substantial amount of axial shaft movement must be accommodated because of fore-and-aft movement of the vehicle engine on its resilient mounts.

It is, therefore, an object of the present invention to provide an improved resilient mounting for a vehicle propeller shaft.

Another object of the invention is to provide an improved and simplified offset pivot type of resilient shaft mounting.

A further object of the invention is to provide an offset trunnion type shaft bearing hanger including mounting brackets adaptable for varying the distance between the shaft axis and the vehicle frame.

An additional object of the invention is to provide an improved offset pivot type shaft mounting assembly including a tiltable bearing rotatably supporting the shaft.

Still another object of the present invention is to provide a shaft bearing hanger with offset pivots resiliently secured to a vehicle frame and an anti-friction bearing rotatably mounting the shaft with the outer bearing race tiltably retained in a mating socket in the hanger.

Still another object of the invention is to provide a shaft bearing hanger with a bearing rotatably and tiltably securing the shaft in the hanger and including offset trunnion pivots resiliently and adjustably secured to a vehicle frame by means of resilient bushings and reversible sheet metal clamp brackets.

Other objects, features and advantages of the present invention will be apparent from the following detailed description of one embodiment, by way of preferred example only, taken in conjunction with the accompanying drawings.

On the drawings:

Figure 1 is a front elevational view of a bearing hanger according to the present invention with one resilient mount shown in section;

Figure 2 is a sectional view, with parts in elevation, taken along line II—II of Figure 1;

Figure 3 is an axial sectional view of one of the resilient mounts and taken along line III—III of Figure 1.

As shown on the drawings:

Figures 1 and 2 illustrate a shaft mounting assembly or bearing hanger 10 including a bracket 11 with an annular bearing housing or central housing portion 12 and a pair of offset outturned and axially aligned pivot bosses or trunnion mounts 14 fixedly secured to or integral with a pair of integral arms 15, 15 extending in the same direction substantially tangentially from opposite sides of the bearing housing or the central portion.

In order to resiliently and pivotally secure the housing 11 to a vehicle cross frame member (not shown), a pair of attachment or mounting brackets 16, 16 are provided. A resiliently yieldable D-shaped bushing 17, formed of rubber or the like, is disposed in conforming relation about each of the bosses 14 with the inner edges of the bushings abutting annular shoulder 18 formed at the juncture of the bosses 14 and the arms 15. Each of the brackets 16 includes a generally flat strap portion 19 and a generally U-shaped strap portion 20 with abutted end flanges 21 and 22, respectively. A generally D-shaped central bight portion 24 is formed between the straps 19 and 20 intermediate the end flanges 21 and 22 by means of a substantially flat central portion 25 of the flat strap 19 and an opposed arcuate U-shaped portion 26 of the U-shaped strap 20. The D-shaped bight portion 24 is provided with a circumferential depression 27 afforded by external raised rib portions 28 and 29 formed in the central portions of the straps 19 and 20, respectively. For securing the straps 19 and 20 to one another and to the vehicle frame, aligned bolt holes 30 and 31 are formed through the end flanges 21 and 22, respectively.

As seen in the drawings, the bight portions 24 of the attachment brackets are disposed in conforming relation about the bushings 17. The bushings are compressed or pre-loaded within the bight portions so that the material of the bushings flows into conforming, retaining relation in the circumferential depressions. It will be noted that the inner ends of the straps do not contact the shoulders 18 so that no metal-to-metal contact is allowed between the attachment brackets 16 and the bracket 11. Pivoting of the bracket 11 with respect to the brackets 16 will be accomodated by shear or torsional twist in the pre-loaded bushings 17.

According to the concepts of the present invention, means are provided for rotatably and tiltably supporting a vehicle propeller shaft assembly 32 extending through the central portion 12. To this end, an opening 34 is formed through the central portion 12 and is provided with a segmental spherical socket 35. The axis of the opening 34 and the socket 35 is perpendicular to and offset from the pivot axis of the trunnion mounts 14. An anti-friction bearing 36, having an outer race 37, an inner race 38 and a plurality of ball bearings 39, has an outer segmental spherical surface 40 formed on the outer race 37 in conforming bearing contact in the socket 35. The bearing inner race 38 is secured about a portion of the shaft assembly 32 so that rotation of the shaft is accommodated by the ball bearings 39 and universal tilting is afforded by the mating spherical bearing surfaces.

It should be noted that the distance between the propeller shaft axis and the vehicle frame can be varied by pivoting the mounting brackets 180° about the trunnions 14. Furthermore, the change in shaft axis location between the two positions of the mounting brackets can easily be varied by varying the amount of offset of the flanges 21 and 22 from the pivot axis of the trunnion. Hence, substantially the same hanger assemblies can be utilized for mounting the propeller shafts in different vehicles.

In order to prevent the egress of lubricant and the ingress of dirt particles and the like with respect to the ball bearings 39, a pair of outer race ring carried seals 41, 41 may be provided. The seals may comprise an outer retainer ring 42 and an inner retainer ring 44 pressed into the outer race ring 37 with a felt sealing ring 45 secured between the retainer rings in position for continuous sealing contact with the inner race ring 38. The retainer rings 42 and 44 have attachment portions 46 secured in counterbores 47 formed at opposite ends of the outer race 37. The felt sealing rings will not rotate but will tilt with the bearing and shaft.

It will thus be seen that the hanger 10 rotatably and resiliently supports the propeller shaft 32 so that vibrations and noise generated by the shaft will not be transmitted to the vehicle frame. Fore-and-aft movement of the vehicle power plant resulting in axial movement of the shaft will be accommodated by pivoting on the trunnions 14 and consequent tilting of the anti-friction bearing 36 to maintain the propeller shaft axis in its proper alignment. The resilient bushings insure proper alignment between the shaft and the frame to prevent undesirable bearing loads by compensating for manufacturing tolerances. The swing action feature of the bearing hanger also allows for variations in the propeller shaft length when installation is made.

It will be understood that modifications and variations may be effected without departing from the scope of the novel concepts of the present invention.

We claim as our invention:

1. A bearing hanger adapted for resiliently supporting a rotatable shaft from a stationary member, comprising a bracket having a central housing portion angularly fixed with respect thereto for freely encircling the shaft, pivot mounts with a pivot axis transverse to the axis of a shaft in said central housing portion but not passing therethrough, bearing means adapted for rotatably and tiltably securing said shaft relative to said central housing portion, and attachment means including resilient elements for resiliently securing said pivot mounts to the stationary member.

2. A bearing hanger for rotatably supporting a shaft from a support while accommodating tilting and axial shifting of the shaft relative to the support, comprising a bracket having a central housing portion non-rotatively attached thereto and trunnion mounts on said bracket and having axes extending transverse to the axis of said shaft but not therethrough, mounting brackets, resilient bushings pivotally securing said trunnion mounts to said brackets for accommodating axial shifting of the shaft, a bearing for rotatably supporting the shaft, and means universally mounting said bearing in the central housing portion of said bracket for accommodating tilting movement of the shaft relative thereto.

3. A bearing hanger adapted for rotatably and resiliently supporting a rotating shaft, comprising a housing having a socket therein encircling said shaft and a pair of aligned offset bosses extending perpendicularly with respect to the axis of the socket, a bearing tiltably secured in said socket and adapted to rotatably support the shaft, a resilient bushing enveloping each of said bosses, and a mounting bracket enveloping each of said bushings and spaced from said bosses, whereby axial movement of the shaft is accommodated by tilting of said bearing in said socket and pivoting of said housing on said brackets.

4. In a bearing support adapted for a vehicle propeller shaft, a hanger having an annular bearing housing with arms extending substantially tangentially and in the same direction from opposite sides of said housing, outturned trunnions on the ends of the arms, mounting brackets enveloping said trunnions, rubber bushings between the brackets and trunnions pivotally securing said brackets to said trunnions to provide a common pivot axis for the hanger, said bearing housing having a segmental spherical socket therein, a bearing having an outer race ring with an external segmental spherical surface tiltable in said socket, and said bearing having an inner race ring adapted for rotatably supporting the shaft.

5. A bearing hanger adapted for rotatably and resiliently supporting a propeller shaft from a vehicle frame, comprising a housing having an annular bearing carrier with tangential opposed arms and outturned axially aligned lugs on the ends of the arms, a bearing for rotatably supporting the shaft, means tiltably mounting said bearing in said carrier, a D-shaped resiliently bushing disposed about each of said lugs, a pair of mounting brackets each including two sheet metal straps with abutted end flanges and cooperating central bight portions between the straps forming a D-shaped receptacle, said D-shaped receptacles tightly enveloping said D-shaped bushings, and means for securing said end flanges to a vehicle frame to selectively position the D-shaped receptacles relative to the lugs for controlling the tilting axis of the hanger.

6. In a bearing support for a vehicle propeller shaft, a housing having a central portion with a segmental spherical socket therein and a pair of aligned oppositely extending trunnion bosses offset with respect to said socket, the axis of said bosses extending substantially perpendicularly to the axis of said socket, an anti-friction bearing having an outer race with a segmental spherical outer surface in conforming relation within said socket and an inner race adapted for securing about the propeller shaft, a resiliently yieldable bushing disposed about each of said bosses, and a clamping bracket secured about each of said bushings and affixed to the vehicle, whereby the propeller shaft will be resiliently and rotatably secured to the vehicle and whereby axial movement of the shaft will be accommodated by pivoting on said trunnion bosses and rocking of said bearing in said socket.

7. A bearing support assembly for rotatably and resiliently securing a propeller shaft to a cross frame member of a vehicle, comprising a housing having a central portion with a segmental spherical socket therein and a pair of axially aligned trunnion bosses offset from and perpendicular with respect to the axis of said socket, an anti-friction bearing having an outer race with a segmental spherical surface retained in conforming relation in said socket, said bearing having an inner race for securing about the propeller shaft, a resiliently yieldable bushing disposed about each of said bosses, a pair of mounting brackets each including two sheet metal straps with abutted end flanges and a central bight portion formed between the straps, said bight portions being compressingly engaged about the respective bushings and having circumferential depressions with portions of the bushings compressed therein, and means for securing said bracket end flanges to the vehicle frame, whereby the propeller shaft will be resiliently and rotatably secured to the vehicle and whereby axial movement of the shaft will be accommodated by pivoting on said trunnion bosses and tilting of said bearing in said socket.

References Cited in the file of this patent

UNITED STATES PATENTS

| Number | Name | Date |
|---|---|---|
| 560,297 | Lobee | May 19, 1896 |
| 1,740,046 | Steen | Dec. 17, 1929 |
| 2,450,279 | Guy | Sept. 28, 1948 |
| 2,661,985 | Guy et al. | Dec. 8, 1953 |